(12) United States Patent
Shi et al.

(10) Patent No.: US 9,032,394 B1
(45) Date of Patent: May 12, 2015

(54) DEPLOYING DRIVERS FOR AN OPERATING SYSTEM ON A COMPUTING DEVICE

(75) Inventors: Wenzhe Shi, Beijing (CN); Jeff Hall, Syracuse, UT (US)

(73) Assignee: Crimson Corporation, Dover, DE (US)

( * ) Notice: Subject to any disclaimer, the term of this patent is extended or adjusted under 35 U.S.C. 154(b) by 1071 days.

(21) Appl. No.: 12/970,448

(22) Filed: Dec. 16, 2010

(51) Int. Cl.
*G06F 9/445* (2006.01)
*G06F 9/44* (2006.01)

(52) U.S. Cl.
CPC ............. *G06F 8/61* (2013.01)

(58) Field of Classification Search
CPC ............. G06F 8/61; G06F 8/65; G06F 8/71
See application file for complete search history.

(56) References Cited

U.S. PATENT DOCUMENTS

| | | | |
|---|---|---|---|
| 6,247,081 B1 * | 6/2001 | Murata | 710/104 |
| 6,918,113 B2 * | 7/2005 | Patel et al. | 717/178 |
| 7,945,897 B1 * | 5/2011 | Cook | 717/121 |
| 8,365,164 B1 * | 1/2013 | Morgenstern | 717/175 |
| 8,418,168 B2 * | 4/2013 | Tyhurst et al. | 717/173 |
| 8,464,245 B2 * | 6/2013 | Thornley | 717/174 |
| 2006/0150167 A1 * | 7/2006 | Ziegler et al. | 717/143 |
| 2011/0126192 A1 * | 5/2011 | Frost et al. | 717/178 |
| 2011/0320799 A1 * | 12/2011 | Lam | 713/2 |
| 2012/0291023 A1 * | 11/2012 | Lu et al. | 717/178 |

OTHER PUBLICATIONS

Lohmann et al., Aspect-aware operating system development, Mar. 2011, 12 pages.*
Sutherland et al., Acquiring volatile operating system data tools and techniques, Apr. 2008, 9 pages.*
Microsoft Corporation, Microsoft Windows Corporate Deployment Tools User's Guide [computer file] Version 1, May 14, 2008, <http://www.microsoft.com/downloads/en/details.aspx?FamilyID=673a1019-8e3e-4be0-ac31-70dd21b5afa7&displaylang=en>, Accessed Mar. 2, 2011.
Microsoft Corporation, Windows Automated Installation Kit (Windows AIK) User's Guide [computer file] Version 1.0, Jul. 21, 2008, http://www.microsoft.com/downloads/en/details.aspx?FamilyID=993C567D-F12C-4676-917F-05D9DE73ADA4, Accessed Mar. 2, 2011.

* cited by examiner

*Primary Examiner* — Thuy Dao
(74) *Attorney, Agent, or Firm* — Austin Rapp & Hardman

(57) ABSTRACT

A computing device configured for installing an operating system is described. The computing device includes a storage device, a processor and instructions stored in memory. The computing device begins writing an operating system image to a storage device. One or more current storage device driver files are downloaded. The computing device injects one or more current storage device drivers obtained from the one or more current storage device driver files without first booting an operating system obtained from the operating system image.

23 Claims, 10 Drawing Sheets

US 9,032,394 B1

DEPLOYING DRIVERS FOR AN OPERATING SYSTEM ON A COMPUTING DEVICE

TECHNICAL FIELD

The present disclosure relates generally to computers and computer-related technology. More specifically, the present disclosure relates to deploying drivers for an operating system on a computing device.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Many computers may be connected to such networks. These computers are often referred to as nodes. One or more servers or computers may provide data, services and/or may be responsible for managing other computers on the network. A computer network may include hundreds or even thousands of nodes.

Computers may often need to be set up and/or maintained. For example, new computers may need to have software or hardware installed. Furthermore, old hardware or software may fail or become outdated. Accordingly, the old hardware or software may often need to be replaced with other hardware or software. At times, new software may need to be installed on many nodes of a network. Thus, it may be desirable to install software on one or more nodes using a network. Different nodes on a network may be configured differently, however. These differences may make it difficult or time consuming to install software for different nodes. Thus, improved systems and methods for installing software on a network node may be beneficial.

DETAILED DESCRIPTION

Figure 1:
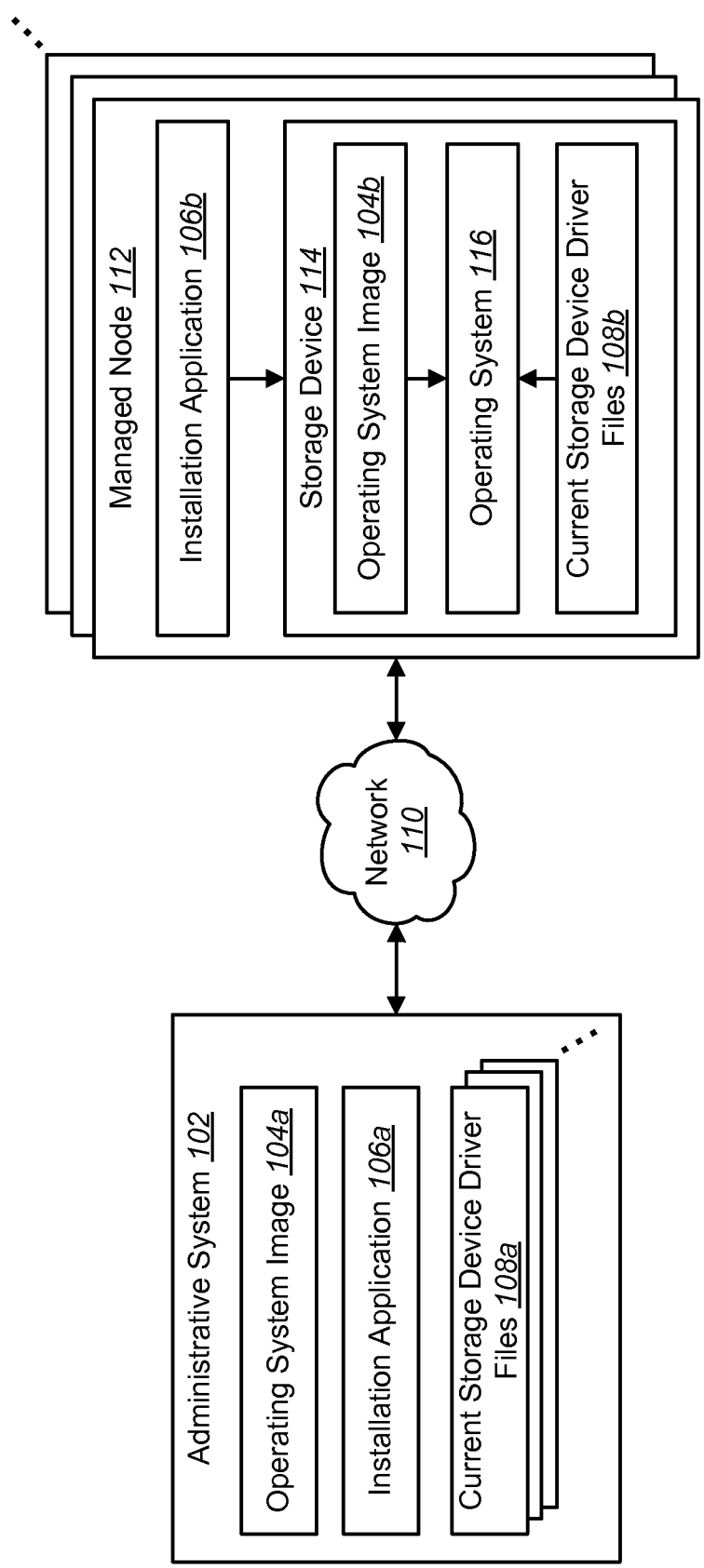
FIG. 1 is a block diagram illustrating one configuration of a system where systems and methods for deploying drivers for an operating system on a computing device may be implemented.

A computing device configured for installing an operating system is disclosed. The computing device includes a storage device and instructions stored in memory. The computing device begins writing an operating system image to a storage device. The computing device also downloads one or more current storage device driver files. The computing device further injects one or more current storage device drivers obtained from the one or more current storage device driver files without first booting an operating system obtained from the operating system image. The computing device may execute the instructions in a pre-installation environment on the computing device. The operating system image may be a uniform operating system image that does not include one or more current storage device drivers. The driver information may include hardware identification information, service information, class Globally Unique Identifier (GUID) information and service binary information.

Injecting the one or more current storage device drivers may include extracting driver information from the one or more current storage device driver files and constructing one or more registry entries based on the driver information. Injecting the one or more current storage device drivers may also include writing the one or more registry entries to a registry file and copying a system file to a driver directory.

Beginning writing the operating system image to the storage device may be initiated by received installation commands. The computing device may also finish writing the operating system image to the storage device. The computing device may also be booted from the storage device. The one or more current storage device drivers may be used by the computing device in order to access the storage device when booting from the storage device.

The computing device may also download an installation application. The computing device may also download an operating system image. The computing device may further download one or more current device drivers other than the one or more current storage device drivers. The computing device may also install the one or more current device drivers other than the current storage device drivers.

The computing device may additionally identify the storage device. The computing device may also request one or more current storage device driver files based on identifying the storage device. The computing device may install any of the operating systems selected from a group including Microsoft® Windows 2000, Windows XP, Windows 2003, Windows Vista, Windows 2008 and Windows 7.

A computing device configured for deploying an operating system is also disclosed. The computing device includes a processor and instructions stored in memory. The computing device sends an installation application. The computing device further sends a uniform operating system image. The computing device additionally sends installation commands.

Furthermore, the computing device receives a request for one or more current storage device drivers. The computing device also sends one or more current storage device drivers based on the request. The installation application, the uniform operating system image and the one or more current storage device drivers may be sent to a plurality of computing devices, each having a different hardware configuration.

A method for installing an operating system on a computing device is also disclosed. The method includes beginning writing an operating system image to a storage device on a computing device. The method also includes downloading, to the computing device, one or more current storage device driver files. The method additionally includes injecting, on the computing device, one or more current storage device drivers obtained from the one or more current storage device driver files without first booting an operating system obtained from the operating system image.

A method for deploying an operating system from a computing device is also disclosed. The method includes sending an installation application from a computing device. The method also includes sending a uniform operating system image from the computing device. The method further includes sending installation commands from the computing device. Additionally, the method includes receiving a request for one or more current storage device drivers. The method also includes sending, from the computing device, one or more current storage device drivers based on the request.

A non-transitory tangible computer-readable medium for installing an operating system on a computing device is also disclosed. The computer-readable medium includes executable instructions for beginning writing an operating system image to a storage device. The computer-readable medium further includes executable instructions for downloading one or more current storage device driver files. Additionally, the computer-readable medium includes executable instructions for injecting one or more current storage device drivers obtained from the one or more current storage device driver files without first booting an operating system obtained from the operating system image.

A non-transitory tangible computer-readable medium for deploying an operating system from a computing device is also disclosed. The computer-readable medium includes executable instructions for sending an installation application. The computer-readable medium also includes executable instructions for sending a uniform operating system image. Additionally, the computer-readable medium includes executable instructions for sending installation commands. The computer-readable medium further includes executable instructions for receiving a request for one or more current storage device drivers. Executable instructions for sending one or more current storage device drivers based on the request are also included in the computer-readable medium.

The systems and methods disclosed herein may allow a computing device to write an operating system image to a storage device. One or more current driver files may then be downloaded and injected to the target operating system without first booting. Computer users may desire the ability to deploy or install an operating system on one or more computers. Each operating system may need to have one or more device drivers installed in order to function properly. For example, a Microsoft® Windows operating system may need to have a storage device driver that is specific to a storage device being used on the computer in order to boot from the storage device without errors.

When installing an operating system on a computer that has a bootable storage device, several options may be used. For example, a user can use external media such as an optical disc (e.g., Compact Disc (CD), Digital Video Disc (DVD)) to install the operating system on the storage device (e.g., Mass Storage Device (MSD) disk). For example, a user can manually install a Microsoft® Windows operating system using a CD or DVD. The user may then manually install the storage device driver using a Universal Serial Bus (USB) device or other external media (e.g., CD, DVD, floppy disk, etc.) if necessary. This approach typically requires user interaction with the computer. For example, a user may need to connect or place the external media (e.g., CD, DVD, USB device, floppy disk, etc.) in communication with the computer. Thus, this may not be an efficient approach to installing an operating system on several computers. For example, a user may need to interact with each computer separately. Furthermore, a user may have to retrieve a different storage device driver for each computer that has a different hardware configuration.

Deploying an operating system image to the storage device disk is another option. For example, an operating system image may be downloaded or copied to one or more computers from another computer over a network. However, if at least one storage device driver (e.g., that is specific to the storage device being used on the computer) is not included in the operating system image, then the operating system may not boot successfully, and the installation will fail. For example, if a Microsoft® Windows operating system image is deployed to a particular computer and an applicable Mass Storage Device (MSD) driver is not included in the image, Windows cannot boot successfully from the storage device. Rather, a blue screen displaying a 0x0000007b error may appear, and the installation will fail.

One approach to remedying this issue is to include all of the needed storage device drivers inside one operating system image for different computer models. However, this approach may be very time consuming and inefficient for users. For example, a user may have to determine the hardware configuration (e.g., the types of storage devices) for each computer, retrieve storage device drivers for each configuration and include them in the operating system image for all of the computers where the operating system will be installed. Instead, users would like to use a uniform operating system image to deploy to all computers without user interaction.

Another option is where a user may insert specific device drivers for a particular hardware configuration (e.g., of a computer) into an operating system image. The operating system image may then be successfully deployed, but only to those computers with that particular hardware configuration corresponding to the specific device drivers. As can be seen from this discussion, this option or approach may also be very time consuming for a user that desires to deploy an operating system to computers with differing hardware configurations, in that each different hardware configuration may require different drivers.

The systems and methods disclosed herein may deploy an operating system to different computers that have different bootable storage devices using a uniform operating system image. Furthermore, the systems and methods disclosed herein may allow many different operating systems or versions of operating systems to be deployed using a single tool. These systems and methods may not require user interaction during deployment. Rather, they allow storage device drivers to be "injected" before the operating system is instantiated (e.g., booted) during deployment. In one example, this allows a Microsoft® Windows operating system to boot using the storage device without encountering the 0x0000007b "blue screen" error mentioned above.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram illustrating one configuration of a system where systems and methods for deploying drivers for an operating system on a computing device may be implemented. An administrative system 102 and one or more managed nodes 112 may be connected to a network 110. Examples of a network 110 include a Local Area Network (LAN), Wide Area Network (WAN), the Internet, etc. The administrative system 102 may be a computing device. The one or more managed nodes 112 may also be computing devices. Examples of computing devices include servers, desktop computers, laptop computers, netbooks, tablet devices, smart phones, etc. The administrative system 102 and the one or more managed nodes 112 may communicate with each other (e.g., by sending and/or receiving data) via the network 110.

The administrative system 102 may include an operating system image 104a, an installation application 106a and current storage device driver files 108a. The operating system image 104a-b may be a uniform or generic operating system image 104a-b. For example, the operating system image 104a-b may not include current device drivers intended for a specific managed node 112 configuration. More specifically, the operating system image 104a-b may include some drivers, but may not include all of the (e.g., current) drivers needed for an operating system 116 to properly boot on all of the managed nodes 112. The current storage device driver files 108a-b may be sets of files that may be used to install a particular storage device driver. That is, each set of current storage device driver files 108a-b may be a set of files used to install a storage device driver (e.g., on a managed node 112).

The one or more managed nodes 112 may each include a storage device 114. Examples of a storage device 114 include a hard disk or drive, a flash memory device, etc. In one configuration, the storage device 114 may be termed a Mass Storage Device (MSD). The storage device 114 may store an operating system image 104b, an operating system 116 and/or a current storage device driver file 108b. In one configuration, the administrative system 102 sends the operating system image 104a and the installation application 106a to the managed node 112 using the network 110. The managed node 112 receives and stores (e.g., downloads) the operating system image 104b and installation application 106b. That is, the operating system image 104b stored on the managed node 112 storage device 114 may be a copy of the operating system image 104a on the administrative system 102. Similarly, the installation application 106b on the managed node 112 may be a copy of the installation application 106a on the administrative system 102. The administrative system 102 may also send one or more current storage device driver files 108a to the managed node 112 (e.g., as requested by the managed node 112). The managed node 112 may receive and store (e.g., download) at least one set of current storage device driver files 108b. The current storage device driver files 108b on the managed node 112 may be specific to the storage device 114 included on the managed node 112. For example, different managed nodes 112 may have different storage devices 114 where each may use a different storage device driver. The current storage device driver files 108a on the administrative system 102, for example, may include many different sets of current storage device driver files 108a used for different storage devices 114 (e.g., on different managed nodes 112).

The managed node 112 may use the operating system image 104b and the current storage device driver files 108b to install the operating system 116. For example, the operating system 116 included on the managed node 112 may be an operating system 116 that is partially or fully installed (e.g., and/or partially or fully copied to the managed node 112). However, the operating system 116 may not have been booted or "instantiated." The operating system 116 may need to incorporate or install an appropriate current storage device driver (e.g., using the current storage device driver files 108b) in order to function properly. The installation application 106b may be used by the managed node 112 in order to "inject" a current storage device driver into the operating system 116 using the current storage device driver files 108b, thus allowing it 116 to function properly.

Figure 2:
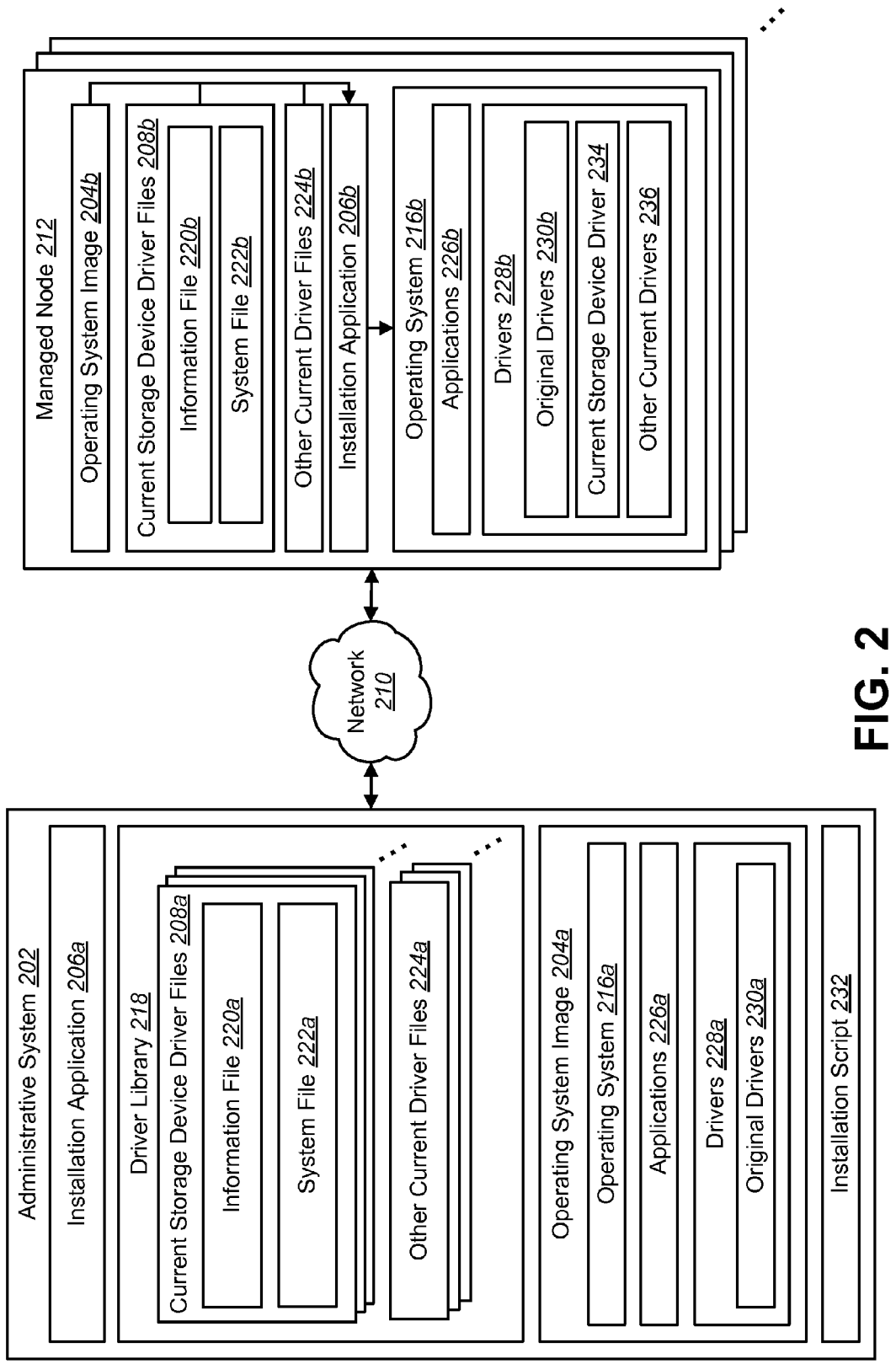
FIG. 2 is a block diagram illustrating a more specific configuration of a system where systems and methods for deploying drivers for an operating system on a computing device may be implemented.

FIG. 2 is a block diagram illustrating a more specific configuration of a system where systems and methods for deploying drivers for an operating system on a computing device may be implemented. The network 210 allows the administrative system 202 to communicate with one or more managed nodes 212. For example, the administrative system 202 and one or more managed nodes 212 send data to and/or receive data from each other. The administrative system 202 may include an installation application 206a, a driver library 218, an operating system image 204a and an installation script 232.

The driver library 218 may include one or more sets of current storage device driver files 208a and other current driver files 224a. In general, drivers 230a-b, 234, 236 (e.g., and driver files 208a-b, 224a-b) may include computer code, software, programs, instructions and/or data that a computing device (e.g., managed node 212) may use in order to communicate with and/or properly utilize particular hardware devices or hardware components attached to the computing device. Each set of the current storage device driver files 208a-b may correspond to a storage device driver (e.g., current storage device driver 234) and may include an information file 220a-b and a system file 222a-b. The information file 220a may include information that may be used to "inject" or install a current storage device driver 234. For example, the information file 220a may include information that may be used to create registry entries in an operating system 216b for a current storage device driver 234. The system file 222a-b may include information and functions that an operating system 216b (e.g., or managed node 212) may use to properly utilize a corresponding current storage device driver 234. In one configuration, the system file 222a-b may be a driver file. For example, the system file 222a-b may be an executable binary file of a driver. The other current driver files 224a-b may be files used to install other current drivers 236 for devices such as audio cards, network adapters, video cards, monitors, peripherals (e.g., mice, keyboards, etc.), communication interfaces (e.g., USB ports, Institute of Electronics and Electrical Engineers (IEEE) 1394 ports, etc.), printers and other devices, for example.

The operating system image 204a included on the administrative system 202 may include software, data, and/or instructions. The operating system image 204a may be a uniform or generic operating system image 204a that may be used to install the operating system 216a-b on one or more managed nodes 212. In one configuration, the operating system image 204a may include software, data and/or instructions that constitute an operating system 216a, one or more applications 226a and drivers 228a. The applications 226a-b may be applications 226a-b intended for use on the managed nodes 212. Examples of applications 226a-b include word processing applications (e.g., Microsoft® Word), spreadsheet applications (e.g., Microsoft® Excel), web browsers (e.g., Microsoft® Internet Explorer, Google Chrome), or any other software desired for use on a managed node 212.

The operating system image 204a drivers 228a may initially include only original drivers 230a (e.g., if any at all). Examples of original drivers 230a include drivers that were included in a model or master operating system image 204a. However, the original drivers 230a may not be drivers 230a that are specific to a particular managed node 212, for example. That is, the operating system image 204a may not initially include a current storage device driver 234 or other current drivers 236. Furthermore, the operating system image 204a may not initially include current storage device driver files 208b or other current driver files 224b. The operating system image 204a may thus be deemed "generic" or "uniform" since it may not include drivers that are specific to a particular managed node 212. Because the operating system image 204a-b is generic, it may be applied to a wide variety of managed nodes 212 with differing hardware configurations. These disparate managed nodes 212 may be different models including different motherboards, chipsets and/or storage devices 114, for example.

The installation script 232 may comprise software instructions or code that may be used to instruct a managed node 212 to begin installing an operating system 216b. This installation script 232 may provide instructions to the managed node 212 with the managed node 212 operating in a pre-installation environment, for example. Additionally or alternatively, the installation script 232 may comprise instruction or code used to install or update drivers after the first boot of the (newly installed) operating system 216b. The installation script 232 may include text-oriented instructions (e.g., "commands"). In one configuration, the commands in the installation script 232 may be executed by the installation application 206b. Even if a managed node 212 does not currently have a full operating system 216b installed and/or running, the managed node 212 may begin installation of the operating system 216b. In one configuration, the administrative system 202 may send commands from the installation script to the managed node 212. Alternatively, the administrative system 202 may send the installation script 232 to the managed node 212, which may execute the instructions in the installation script.

The administrative system 202 may send the installation application 206a to the managed node 212 using the network 210. The managed node 212 may receive and store (e.g., download) the installation application 206b. The installation application 206a-b may comprise software, instructions, and/or computer code. The installation application 206b on the managed node 212 may function in a "pre-installation" environment or otherwise. Examples of pre-installation environments include Windows Pre-installation Environment (WinPE) 1.x and WinPE 2.x. In one configuration, for example, the managed node 212 does not have a full operating system 216b installed on it when the installation application 206b is received and/or stored (e.g., downloaded). Alternatively, the installation application 206b may also function even though an operating system is currently installed and/or running on the managed node 212. Thus, the installation application 206b may work in both conditions. For example, the installation application 206b may install an operation system on a managed node 212 that does not currently have an operating system or may replace an existing operating system on the managed node 212.

The administrative system 202 may also send the operating system image 204a to one or more managed nodes 212. The operating system image 204b may be received by and/or stored (e.g., downloaded) on one or more managed nodes 212. In one configuration, the administrative system 202 unilaterally sends the operating system image 204a to be received and stored by one or more managed nodes 212. In another configuration, the managed node 212 (e.g., using the installation application 206b) sends a message to the administrative system 202 requesting an operating system image 204a download. Upon receiving the request, the administrative system 202 sends the operating system image 204a to the managed node 212, which receives and stores it 204b. It should be noted that the operating system image 204b on the managed node 212 may be a copy of the operating system image 204a on the administrative system 202. Although not shown in FIG. 2, the operating system image 204b on the managed node 212 may thus include data constituting an operating system 216a, applications 226a and drivers 228a (e.g., original drivers 230a). This data may be used by the installation application 206b to install the operating system 216b on the managed node 212, for example.

The administrative system 202 may also send an installation script 232 or instructions to one or more managed nodes 212 using the network 210. The managed node 212 may receive the installation script 232 or instructions from the installation script 232 on the administrative system 202 (e.g., over the network 210). The managed node 212 may execute the installation script 232 or instructions in order to begin installing (e.g., or writing) the operating system 216b using the operating system image 204b.

The installation application 206b on the managed node 212 may include instructions generally used to download and/or install software and/or data. For example, the installation application 206b may include instructions that the managed node 212 may use to download current storage device driver files 208b and/or other current driver files 224b from the driver library 218. In one configuration, the installation application 206b identifies one or more hardware components included in and/or attached to the managed node 212. For example, the installation application 206b may retrieve information from the managed node 212 and/or attached hardware components used to identify which driver files 208a, 224a (e.g., in the driver library 218) may be used as current driver files 208b, 224b on the managed node 212. The current driver files 208b, 224b may be used by the managed node 212 to inject or install current drivers 234, 236 (e.g., in order to properly utilize the attached hardware components). In one configuration, the installation application 206b may identify a storage device 114 included in the managed node 212. For instance, a storage device 114 may provide identifying information to the installation application 206b (e.g., at the installation application's 206b request). Other identifying information from other hardware components or devices may be retrieved by the installation application 206b in a similar manner. For instance, the installation application 206b may use one or both of two approaches to identify the driver files 208a, 224a to be downloaded. In one approach, the installation application 206b may obtain hardware identification information from the managed node 212 to identify which drivers are needed. Additionally or alternatively, the installation application 206b may obtain the manufacturer and model information of the managed node 212, which may enable it 206b to get the hardware list of a relevant hardware model from the driver library 218.

The installation application 206b may request (e.g., send a message to the administrative system 202 over the network 210) one or more particular sets of current storage device driver files 208a and/or other current driver files 224a from the driver library 218 based on the identifying information it has retrieved. The administrative system 202 may respond by sending one or more relevant sets of current storage device driver files 208a and/or other current driver files 224a to the managed node 212. Thus, the installation application 206b may identify and/or download a set of current storage device driver files 208b and/or other current driver files 224b that are relevant to the managed node 212.

The installation application 206b may parse and extract information from the information file 220b included in the current storage device driver files 208b. For example, the information file 220b may include information or values used to inject or install a current storage device driver 234 on the managed node 212. The installation application 206b may parse the information file 220b in order to extract this information. In one configuration, the installation application 206b parses the information file 220b and extracts "Hardware ID" (i.e., hardware identification), "Service," "Class GUID" (i.e., Class Globally Unique Identifier) and "Service Binary" information. This information may be used to construct registry entries for use by the operating system 216b. The registry entries may be written to a registry file on the managed node 212. The installation application 206b may copy the system file 222b to a driver directory on the managed node 212.

The managed node 212 may boot the operating system 216b. Because the managed node 212 (e.g., installation application 206b) has injected the current storage device driver 234, the operating system 216b may boot successfully, avoiding an installation failure. For example, injecting the current storage device driver 234 on the managed node 212 may allow the operating system to boot from the storage device 114 without encountering a 0x0000007b blue screen error. The installation application 206b, the installation script 232, and/or the operating system 216b may load or install other current drivers 236 using the other current driver files 224b. In one configuration, the operating system 216b may execute an installation script 232 to install the other current drivers 236 after operating system 216b installation. In some configurations, the other current drivers 236 (other than the current storage device driver 234 or non-mass storage device (non-MSD) driver, for example) may be "injected" in a similar manner by the installation application 206b. However, because only one or more current storage device drivers 234 may be needed to avoid the 0x0000007b blue screen error in some configurations, the installation application 206b may only inject one or more current storage device drivers 234. Other current drivers 236 may be installed after the operating system 216b installation. The newly installed operating system 216b on the managed node 212 may include and allow use of one or more applications 226b and drivers 228b (e.g., including original drivers 230b, a current storage device driver 234 and/or other current drivers 236).

Figure 3:
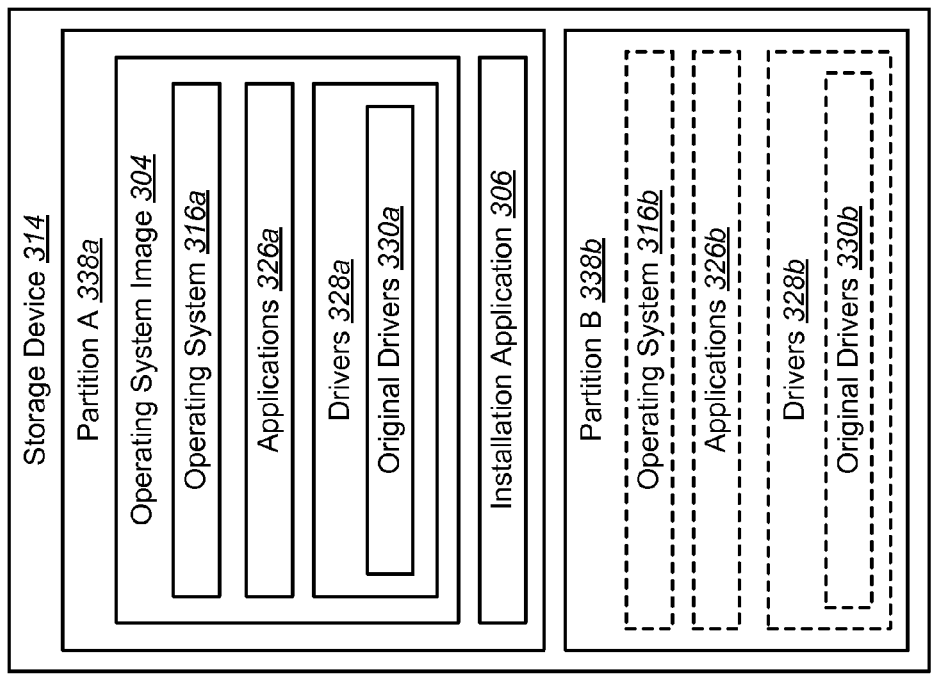
FIG. 3 is a block diagram illustrating one configuration of a storage device having multiple partitions where current drivers have not yet been installed.

FIG. 3 is a block diagram illustrating one configuration of a storage device 314 having multiple partitions 338 where current drivers have not yet been installed. In general, partitions may be divisions of storage space on a storage device. In this example, the storage device 314 includes partition A 338a and partition B 338b. Partition A 338a includes an operating system image 304 and an installation application 306. The operating system image 304 and the installation application 306 may have been downloaded from an administrative system 102. The operating system image 304 includes an operating system 316a, applications 326a and drivers 328a. In this case, the drivers 328a include only original drivers 330a. The operating system image 304 on partition A 338a may be used to install the operating system 316b on partition B 338b. Furthermore, the applications 326b and drivers 328b (e.g., original drivers 330b) may be installed (e.g., written or copied) on partition B 338b using the applications 326a and drivers 328a included in the operating system image 304. As illustrated in FIG. 3, current drivers have not yet been downloaded and installed. Thus, if a managed node 112 attempted to boot the operating system 316b on partition B 338b, the boot may fail (e.g., and hence, installation) in that a current storage device driver may be needed for the operating system 316b to boot. However, the installation application 306 may be used to download and inject or install a current storage device driver to remedy this issue.

Figure 4:
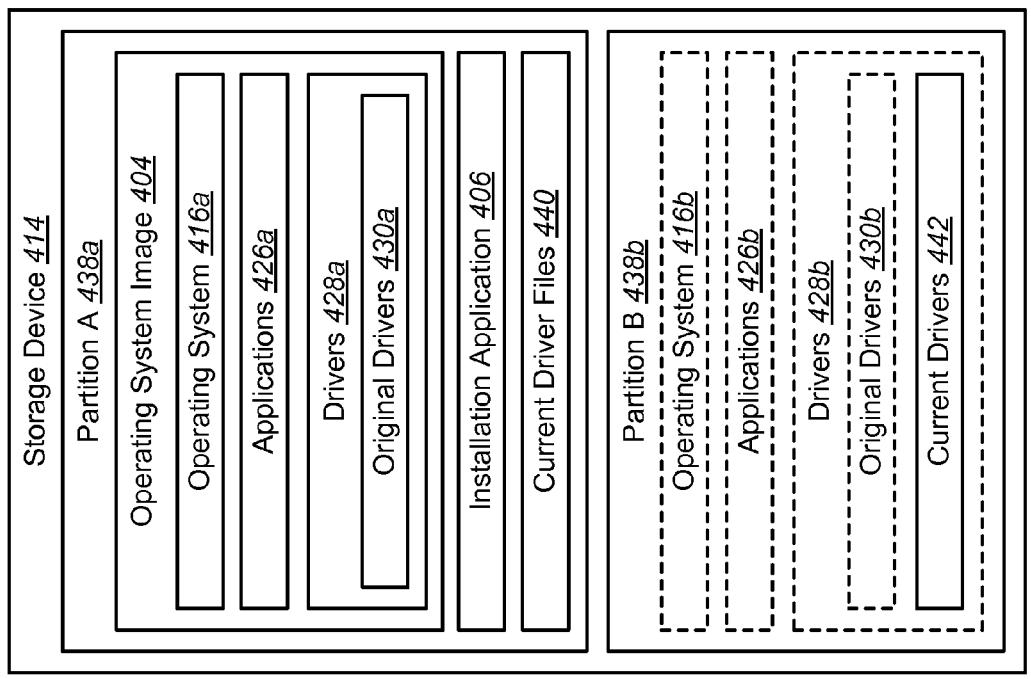
FIG. 4 is a block diagram illustrating another configuration of a storage device having multiple partitions where current drivers have been installed.

FIG. 4 is a block diagram illustrating another configuration of a storage device 414 having multiple partitions 438 where current drivers 442 have been installed. In this example, partition A 438a includes the operating system image 404, the installation application 406 and current driver files 440. Current driver files 440 may be, for example, current storage device driver files 208 and/or other current driver files 224 as illustrated in FIG. 2. The current driver files 440 may have been downloaded at the direction of the installation application 406 (e.g., from an administrative system 102). As similarly described above, the operating system image 404 includes an operating system 416a, applications 426a and drivers 428a (e.g., including original drivers 430a). The operating system image 404 may be used to install (e.g., write or copy) the operating system 416b, applications 426b and/or original drivers 430b on partition B 438b. The installation application 406 may inject or install current drivers 442 into the drivers 428b on partition B 438b using the current driver files 440 on partition A 438a. With the current drivers 442 (e.g., current storage device driver 234) installed, the operating system 416b may boot properly.

Figure 5:
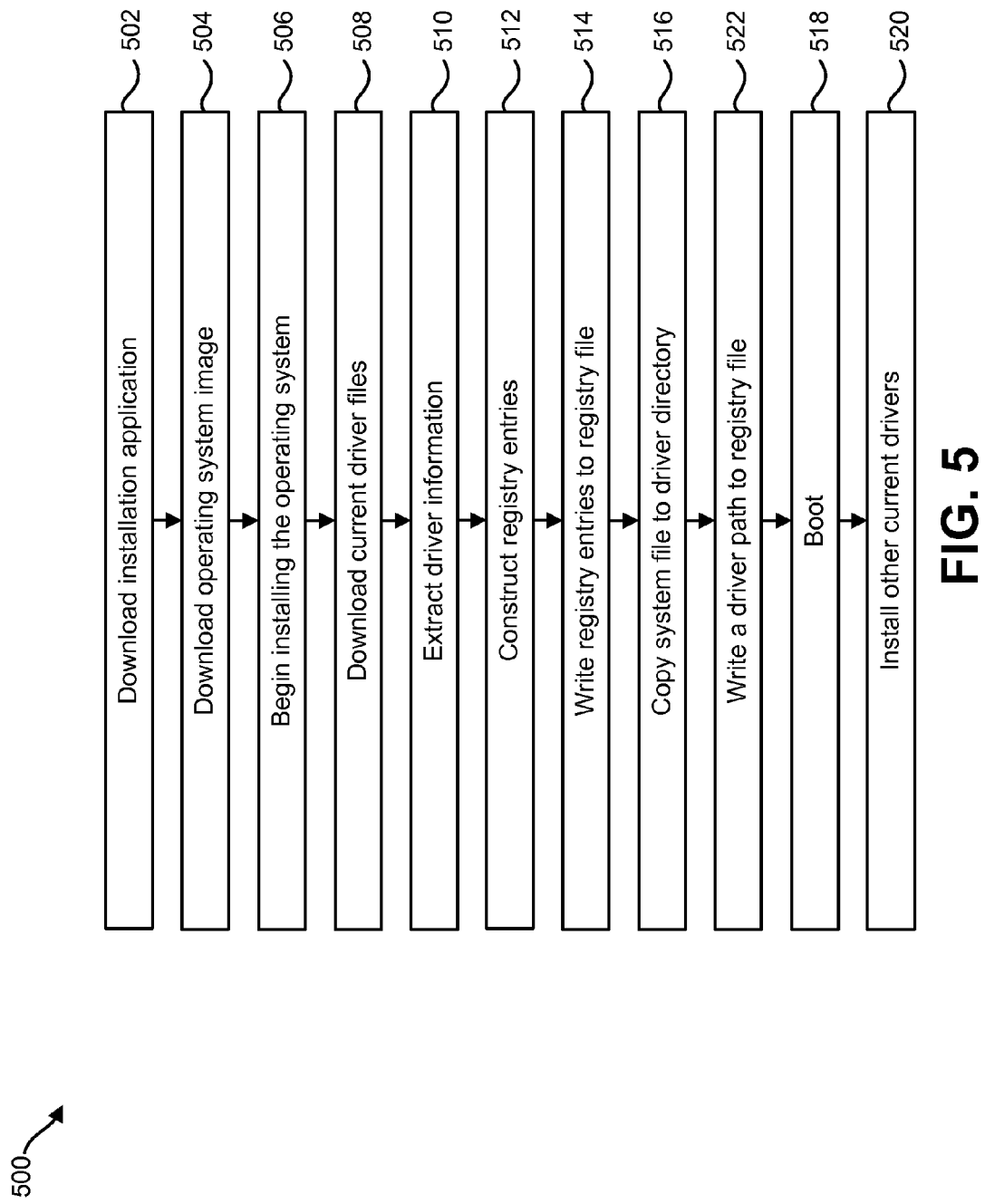
FIG. 5 is a flow diagram illustrating one configuration of a method for deploying drivers for an operating system on a computing device.

FIG. 5 is a flow diagram illustrating one configuration of a method 500 for deploying drivers for an operating system on a computing device. A managed node 112 may download 502 an installation application 106. For example, a managed node 112 may receive and/or store an installation application 106 that has been sent from an administrative system 102. Either the administrative system 102 or the managed node 112 may initiate downloading 502 the installation application 106. The managed node 112 may also download 504 an operating system image 104. As discussed above, the operating system image 104 may be a uniform or generic operating system image 104 that does not include current storage device drivers 234 or files 108. In one configuration, the managed node 112 initiates the operating system image 104 download (e.g., using instructions from the installation application 106). Alternatively, the managed node 112 receives an operating system image 104 download 504 that was initiated by the administrative system 102.

The managed node 112 may begin installing 506 the operating system 116 (e.g., or writing the operating system 116 to the storage device 114). In one configuration, the managed node 112 receives and executes instructions included in an installation script 232 sent from the administrative system 102 to begin installation 506. Thus, the installation application 106 and the operating system image 104 may be downloaded 502, 504 to the managed node 112 (e.g., or "target machine") and operating system 116 installation may begin 506 according to the installation script 232 on the administrative system 102 (e.g., the "core server"). In another configuration, the managed node 112 executes installation application 106 instructions to begin installing 506 the operating system 116.

The installation application 106 may download 508 one or more current storage device driver files 108 and/or other current device driver files 224 (e.g., for audio device drivers, network adapter drivers, etc.) to the managed node 112 (e.g., "target machine"). For example, the installation application 106 may download 508 the current driver files 108, 224 from the driver library 218 according to the managed node's 112 model (e.g., information retrieved from the managed node 112 or hardware components attached to the managed node 112). Alternatively, the installation application 106 may download 508 driver files 108, 224 from another computing device connected to the network 110. For example, the installation application 106 may download 508 driver files 108, 224 from one or more servers or manufacturer websites if one or more addresses (e.g., Hyper Text Transfer Protocol (HTTP) or Universal Naming Convention (UNC) paths) of the driver files 108, 224 are specified in the driver library 218. As discussed above, the current driver files 108, 224 may include an information file 220 and/or a system file 222.

The installation application 106 may extract 510 current driver 108, 224 information or data. That is, the installation application 106 may parse and extract or retrieve current driver 108, 224 information that may be used to "inject" or install one or more current drivers 234, 236. In one configuration, the installation application 106 parses an .inf (e.g., "information") file 220 included in current storage device driver files 108 and extracts 510 information such as "Hardware ID," "Service," "Class GUID" and "Service Binary" information.

The installation application 106 may construct 512 registry entries. For example, the installation application 106 may use the extracted 510 driver information (e.g., from an information file 220) to construct 512 registry entries. In one configuration, the installation application 106 may construct 512 the registry entries as illustrated in Listing (1).
[HKEY_LOCAL_MACHINE\System\CurrentControlSet\Control\CriticalDeviceDatabase\%Hardware ID%]
"Service"="%Service%"
"ClassGUID"="%Class GUID%"
[HKEY_LOCAL_MACHINE\System\CurrentControlSet\Services\%Service%]
"Type"=dword:00000001
"Start"=dword:00000000
"Group"=SCSI miniport
"ErrorControl"=dword:00000001
"ImagePath"="system32\\drivers\\%Service Binary%"

Listing (1)

In Listing (1), the variables illustrated in bold and surrounded by "%%" (i.e., %Hardware ID%, %Service%, %Class GUID% and %Service Binary%) may be replaced with corresponding values (e.g., "Hardware ID", "Service", "Class GUID" and "Service Binary") extracted 510 as discussed above. It should be noted that "SCSI" in Listing (1) is an abbreviation for "Small Computer System Interface."

The installation application 106 may write 514 the registry entries to a managed node's 112 registry file. For example, the installation application 106 may write 514 the registry entries to a registry file that were constructed 512 as discussed above. The registry entries may allow the operating system 116 to use a current storage device driver 234 on the managed node 112. More specifically, in order to "inject" a current storage device driver 108b, the registry entries may need to be written to the registry file. The installation application 106 may also copy 516 a system file 222 to a driver directory. In one configuration, the installation application 106 copies 516 a .sys (i.e., system) file 222 indicated by the extracted 510 "Service Binary" information to a "%windir%\system32\drivers\" directory. In this case, "%windir%" represents a Microsoft® Windows root directory.

The managed node 112 may write 522 a driver path to a registry file. More specifically, the installation application 106 may write 522 a driver path to the registry file. In one configuration, a driver path is a local address where one or more driver files are stored on the managed node 112. These driver files may be downloaded 508 and stored in the storage device 114 by an installation application 106b as described above. In one configuration, in order to install or update drivers after the first boot of the operating system 116, the driver path may need to be written to the registry file and an installation script used. This installation script may command, indicate to and/or tell the operating system 116 to install or update drivers. For instance, a driver path may be appended to "DevicePath" in [HKEY_LOCAL_MACHINE\SOFTWARE\Microsoft\Windows\CurrentVersion]. For example, the driver path may be "C:\Windows\LDDriverStore\MSD" and the old value in the registry may be "DevicePath=%SystemRoot%\inf". The new value, however, may be written 522 as "DevicePath=%SystemRoot%\inf;C:\Windows\LDDriverStore\MSD" in this example.

The managed node 112 may then boot 518 the operating system 116. For example, the managed node 112 may "reboot" and the operating system 116 will boot 518 using a storage device (e.g., Mass Storage Device or MSD) 114 without encountering a 0x0000007b blue screen error. The managed node 112 may then install 520 remaining or other current drivers 236. For example, a Microsoft® Windows operating system 116 may proceed with a mini-setup to load or install 520 the rest of the other current drivers 236 from the other current driver files 224. This method 500 may thus successfully install the operating system 116 (e.g., Microsoft® Windows).

It should be noted that for some configurations of the systems and methods disclosed herein, other actions may occur in addition to the method 500 discussed in connection with FIG. 5. For example, before the method 500 discussed in connection with FIG. 5 is performed, a "sysprep" master operating system image 104 may be prepared. "Sysprep" may refer to a software utility used in deploying a Microsoft® Windows operating system. In some configurations, Windows operating system installations may include many unique elements, such as "Computer name," "Security Identifier" (SID) and "Driver Cache." Before capturing and deploying a disk image to multiple computers, a "sysprep" process may be used to generate new computer names, unique security identifiers (SIDs), and custom driver cache databases.

As discussed in FIG. 1, the administrative system 102 may be installed (e.g., connected to the network 110). Furthermore, one or more managed nodes 112 may be connected to the network 110 to enable performance of the method 500 in FIG. 5. It should also be noted that a user may use the administrative system 102 to begin operating system 116 deployment. Alternatively, operating system 116 deployment may be automated (e.g., when an administrative system 102 detects a new managed node 112 on a network 110, for example).

Figure 6:
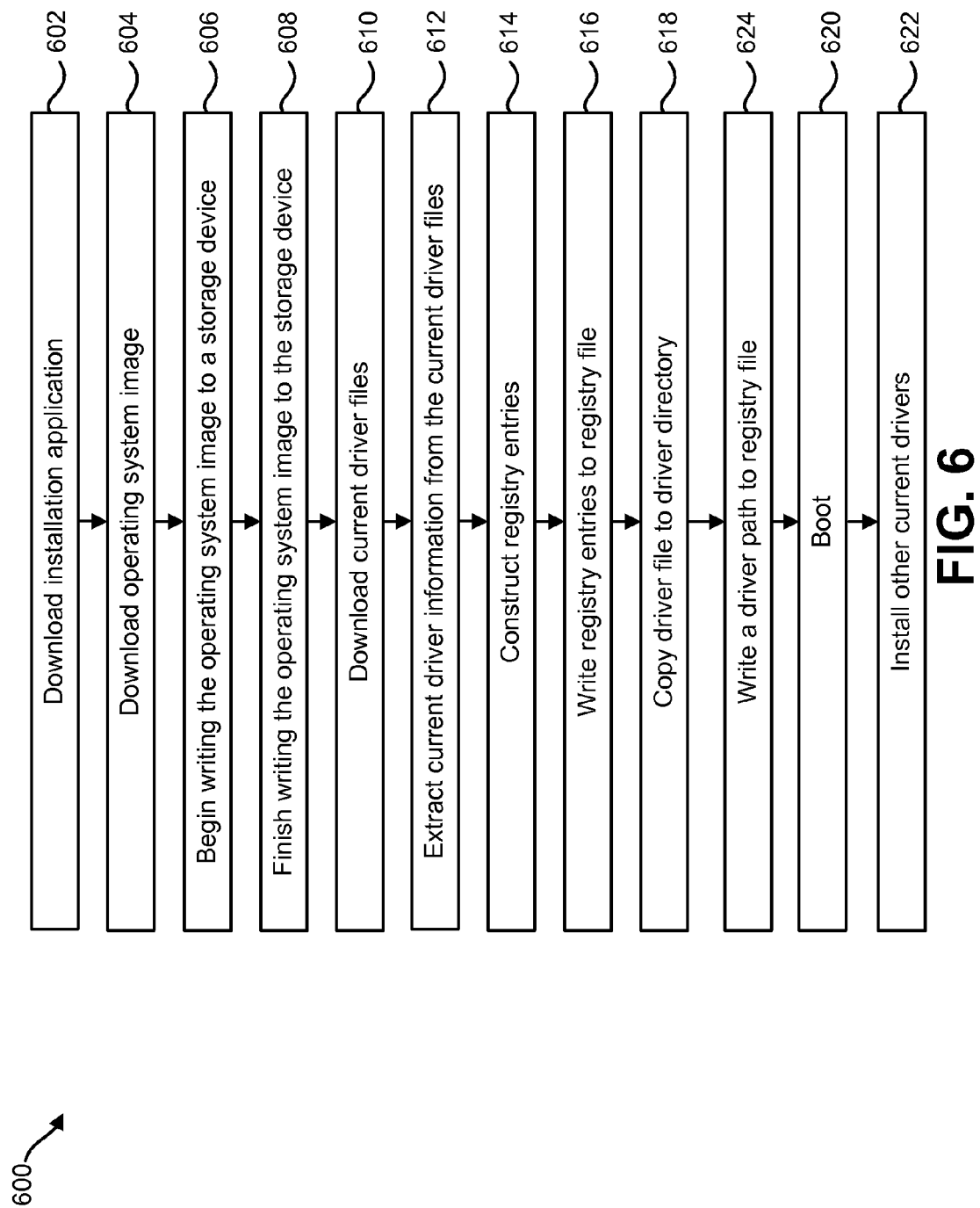
FIG. 6 is a flow diagram illustrating another configuration of a method for deploying drivers for an operating system on a computing device.

FIG. 6 is a flow diagram illustrating another configuration of a method 600 for deploying drivers for an operating system on a computing device. A managed node 112 may download 602 an installation application 106. The managed node 112 may also download 604 an operating system image 104. The managed node 112 may begin writing 606 the operating system image 104 to a storage device 114. In one configuration, the managed node 112 receives and executes instructions included in an installation script 232 sent from the administrative system 102 to begin writing (e.g., "installing") 606 the operating system image 104. The managed node 112 may finish writing 608 the operating system image 104 to the storage device 114 on the managed node 112. Current driver files 108, 224 may be downloaded 610 by the managed node 112. Thus, the installation application 106 and the operating system image 104 may be downloaded 602, 604 to the managed node 112 (e.g., or "target machine") and operating system image 104 writing may begin 606 and finish 608 according to the installation script 232 on the administrative system 102 (e.g., the "core server"). In another configuration, the managed node 112 executes installation application 106 instructions to begin writing 606 and finish writing 608 the operating system image 104 to the storage device 114.

The installation application 106 may download 610 one or more current storage device driver files 108 and/or other current device driver files 224 (e.g., for audio device drivers, network adapter drivers, etc.) to the managed node 112 (e.g., "target machine"). For example, the installation application 106 may download 610 the current driver files 108, 224 from the driver library 218 according to the managed node's 112 model (e.g., information retrieved from the managed node 112 or hardware components attached to the managed node 112). Alternatively, the installation application 106 may download 610 driver files 108, 224 from another computing device connected to the network 110.

The installation application 106 may extract 612 current driver 118, 224 information from the current driver files (e.g., current storage device driver files 108). That is, the installation application 106 may parse and extract or retrieve current driver 108, 224 information that may be used to "inject" or install one or more current drivers 234, 236. In one configuration, the installation application 106 parses an .inf (e.g., "information") file 220 included in current storage device driver files 108 and extracts 612 information such as "Hardware ID," "Service," "Class GUID" and "Service Binary" information.

The installation application 106 may construct 614 registry entries. For example, the installation application 106 may use the extracted 612 driver information (e.g., from an information file 220) to construct 614 registry entries. In one configuration, the installation application 106 may construct 614 the registry entries as illustrated in Listing (1) above.

The installation application 106 may write 616 the registry entries to a managed node's 112 registry file. For example, the installation application 106 may write 616 the registry entries to a registry file that were constructed 614 as discussed above. The registry entries may allow the operating system 116 to use a current storage device driver 234 on the managed node 112. The installation application 106 may also copy 618 a system file 222 to a driver directory. In one configuration, the installation application 106 copies 618 a .sys (i.e., system) file 222 indicated by the extracted 612 "Service Binary" information to a "%windir%\system32\drivers\" directory. The installation application 106 may also write 624 a driver path to the registry file.

The managed node 112 may then boot 620 the operating system 116. For example, the managed node 112 may "reboot" and the operating system 116 will boot 620 using a storage device (e.g., Mass Storage Device or MSD) 114 without encountering a 0x0000007b blue screen error. The managed node 112 may then install 622 remaining or other current drivers 236.

Figure 7:
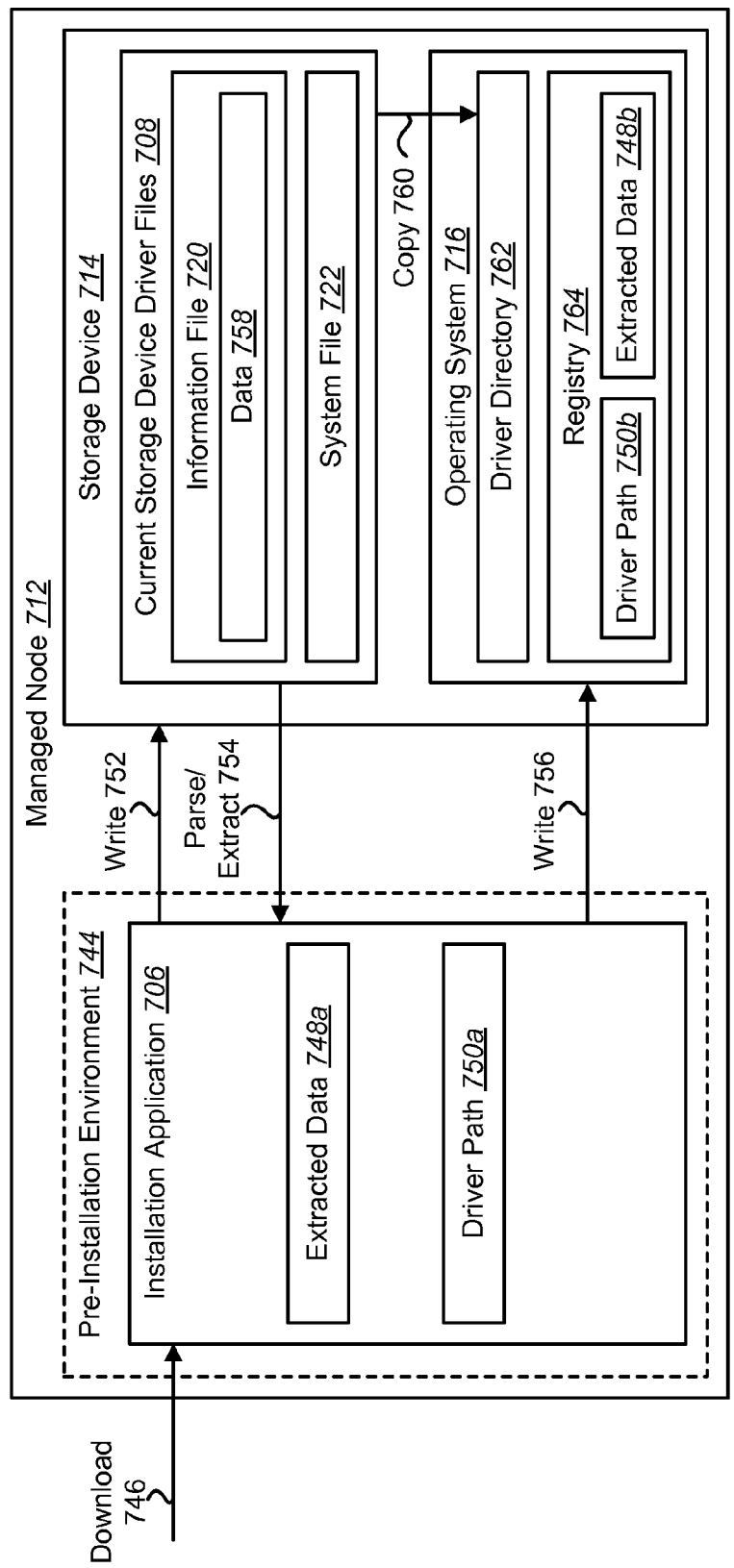
FIG. 7 is a block diagram illustrating one configuration of a managed node where systems and methods for deploying drivers for an operating system on a computing device may be implemented.

FIG. 7 is a block diagram illustrating one configuration of a managed node 712 where systems and methods for deploying drivers for an operating system on a computing device may be implemented. The managed node 712 may download 746 an installation application 706 and an operating system image 104 (i.e., not shown in FIG. 7) in a pre-installation environment 744. The pre-installation environment 744 illustrated in FIG. 7 may represent the operating environment on a managed node 712 before an operating system 716 has been completely installed and is operational. For example, the pre-installation environment 744 may be a Windows Pre-installation Environment (WinPE).

The installation application 706 may function in the pre-installation environment 744. The installation application 706 may retrieve information from the managed node 712 regarding the types of hardware components or devices that are included in the managed node 712. For example, the installation application 706 may query the managed node 712, the storage device 714 and/or other devices for information that identifies them. For example, the installation application 706 may retrieve a model identification of the managed node 712 and/or the storage device 714. While in the pre-installation environment 744, the installation application 706 may download 746 one or more storage device driver files 708 and write 752 them to the storage device 714 of the managed node 712. These storage device driver files 708 may be selected according to the information retrieved about the managed node 712 and/or storage device 714. That is, the installation application 706 may download 746 and write 752 one or more storage device driver files 708 that correspond to the identified storage device 714.

The storage device driver files 708 may include an information file 720 and a system file 722. The installation application 706 may parse 754 the information file 720 and extract 754 (e.g., obtain a copy of) certain data 758 included in the information file 720. The extracted data 748a may include, for example, values or parameters that the installation application 706 may use to inject the storage device driver into the operating system 716, thereby enabling the operating system 716 to boot properly from the storage device 714. The installation application 706 may write 756 the extracted data 748a to the registry 764 in the operating system 716. That is, the extracted data 748b may be injected or written 756 to the registry 764 by the installation application 706. The installation application 706 may also write the driver path 750a to the registry 764.

The driver path 750b may be a path (e.g., address) indicating where the storage device driver(s) is/are stored on the storage device 714. More specifically, a driver path 750b may indicate the local address where the driver files are stored on the managed node 712. These driver files are downloaded and stored in the storage device 714 by the installation application 706 as described above. For example, the driver path 750b is appended to "DevicePath" in [HKEY_LOCAL_MACHINE\SOFTWARE\Microsoft\Windows\CurrentVersion]. For example, the driver path 750b may be "C:\Windows\LDDriverStore\MSD" and the old value in the registry 764 may be "DevicePath=%SystemRoot%\inf." The new value may then be "DevicePath=%SystemRoot%\inf;C:\Windows\LDDriverStore\MSD." Writing the driver path 750b to the registry 764 file may not be necessary for injecting a storage device 714 driver. It may be used to install or update drivers after the first boot of the operating system 716. In order to inject a storage device 714 driver, the registry entries may need to be written to the registry 764 file as discussed above. Furthermore, a system file (e.g., .sys file) 722 may be copied 760 to "%windir%\system32\drivers\" in one configuration. In order to install or update drivers after the first boot of the operating system 716, the driver path 750b may need to be written to the registry 764 file. An installation script may also be used. This script may tell the operating system 716 to install or update drivers.

The installation application 706 may also copy 760 the system file 722 into the driver directory 762 in the operating system 716. When the operating system 716 includes an appropriate system file 722 in its driver directory 762 and appropriate extracted data 748b and a driver path 750b in its registry 764, the operating system 716 may be enabled to properly boot from the storage device 714.

Figure 8:
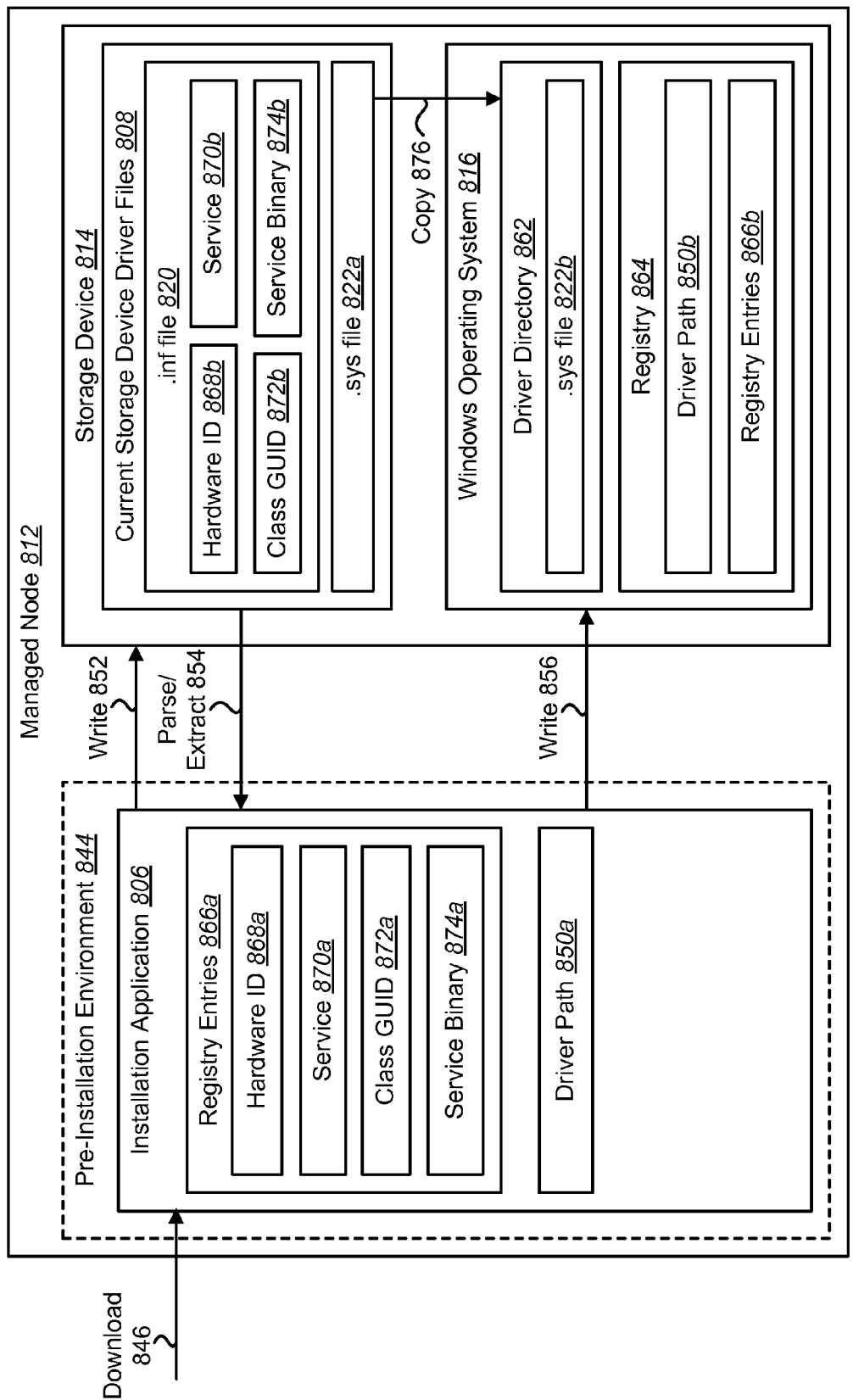
FIG. 8 is a block diagram illustrating a more specific configuration of a managed node where systems and methods for deploying drivers for an operating system on a computing device may be implemented.

FIG. 8 is a block diagram illustrating a more specific configuration of a managed node 812 where systems and methods for deploying drivers for an operating system on a computing device may be implemented. In this example, the managed node 812 downloads 846 an installation application 806 and a uniform (e.g., without specific drivers) Microsoft® Windows operating system 816 image while in a pre-installation environment 844. For example, the systems and methods disclosed herein may be able to inject or install storage device drivers for Windows 2000, Windows 2003, Windows XP, Windows Vista, Windows 2008 or Windows 7 before the managed node 812 (e.g., the Windows operating system 816) is booted. The operating system 816 image may be stored on or downloaded to the storage device 814.

The capability to inject storage device 814 drivers into a wide range of Windows operating systems 816 may be beneficial. For example, a software tool known as Msdinst.exe may add drivers to Windows 2000, Windows XP and Windows 2003. However, Msdinst.exe runs in WinPE 1.x and cannot add drivers to other versions of Windows. Another tool known as Pkgmgr.exe may add drivers to Windows Vista and Windows 2008. However, that tool runs in a WinPE 2.x environment and cannot add drivers to other versions of Windows. Thus, a user would not be able to use a single tool to add drivers to all the versions of Windows mentioned. This is because these tools are operating system 816 dependent. However, the systems and methods disclosed herein allow drivers to be added to Windows 2000, Windows XP, Windows 2003, Windows Vista, Windows 2008 and Windows 7 with a single tool, since the systems and methods disclosed herein are operating system 816 independent. Thus, the systems and methods disclosed herein may assist or allow Information Technology (IT) administrators to implement a more complete hardware-independent imaging solution that requires less user interaction.

The installation application 806 in the pre-installation environment 844 may download 846 current storage device driver files 808 from a driver library 218 on an administrative system 102 and write 852 them to the storage device 814 on the managed node 812. Alternatively, the installation application 806 may download 846 storage device driver files 808 from some other computing device (e.g., web server, etc.). The storage device driver files 808 may include an .inf (information) file 820 and a .sys (system) file 822a. The .inf file 820 may include certain data or values used to inject or install one or more storage device 814 drivers into the Windows operating system 816. In this example, the .inf file 820 includes "Hardware ID" 868b, "Service" 870b, "Class GUID" 872b and "Service Binary" 874b data or values.

The installation application 806 may parse 854 the .inf file 820 and extract 854 the "Hardware ID" 868b, "Service" 870b, "Class GUID" 872b and "Service Binary" 874b data or values. The installation application 806 may then use the extracted "Hardware ID" 868a, "Service" 870a, "Class GUID" 872a and "Service Binary" 874a data or values to construct registry entries 866a. The registry entries 866a may be constructed as illustrated in Listing (1) above, for example. The installation application 806 may write 856 the registry entries 866a and the driver path 850a to the registry 864 file. In other words, the driver path 850b and the registry entries 866b may be written to the registry 864 file in the Windows operating system 816. The installation application 806 may also copy 876 the .sys file 822a to the driver directory 862 included in the Windows operating system 816. That is, the .sys file 822b may be included in the driver directory 862 when copied or written from the current storage device driver files 808. The managed node 812 may then boot the Windows operating system 816 using the storage device 814 without encountering a 0x0000007b blue screen error.

Figure 9:
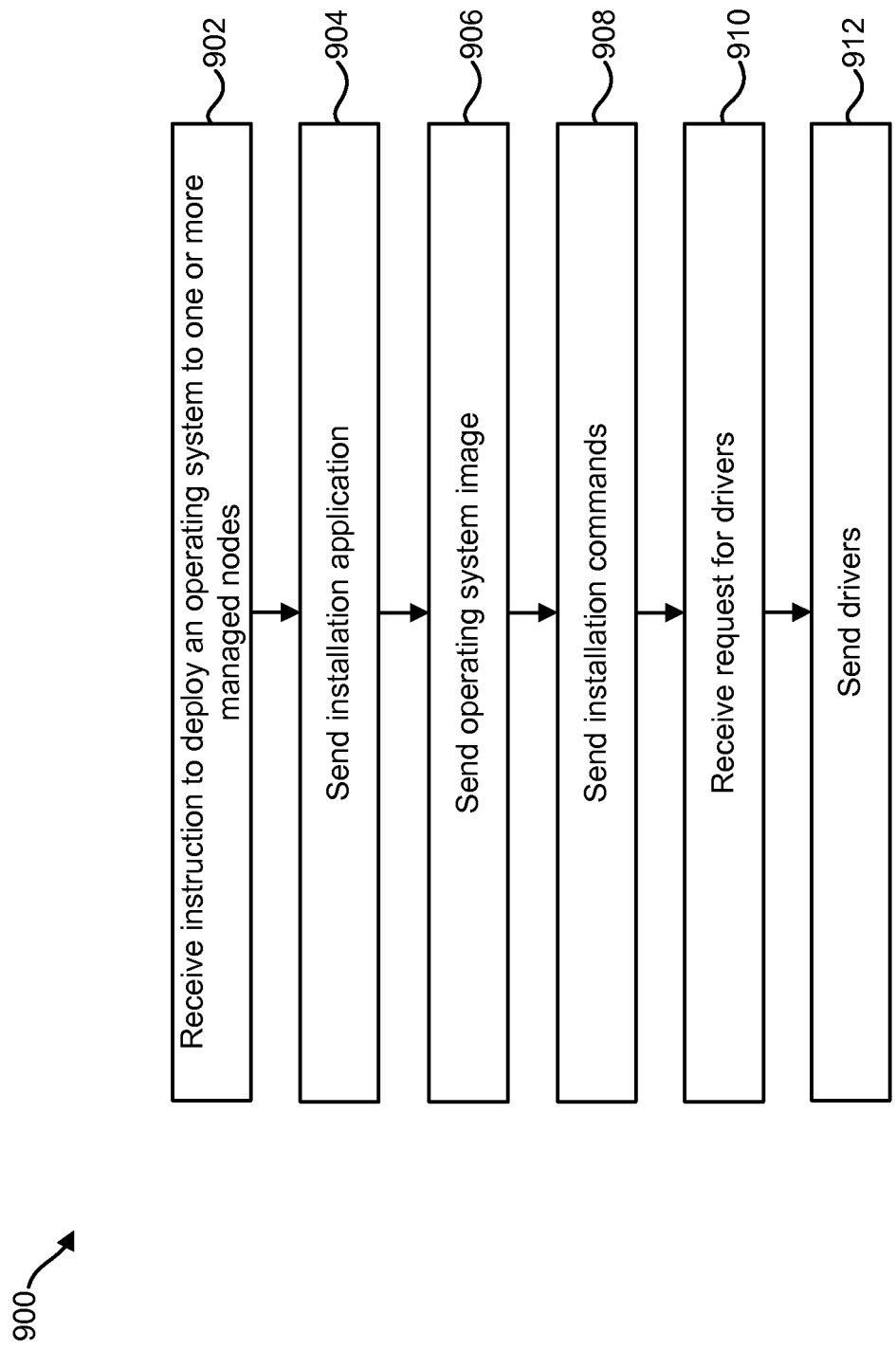
FIG. 9 is a flow diagram illustrating another configuration of a method for deploying drivers for an operating system on a computing device.

FIG. 9 is a flow diagram illustrating another configuration of a method 900 for deploying drivers for an operating system on a computing device. An administrative system 102 may receive 902 an instruction from a user to deploy an operating system 116 to one or more managed nodes 112. Alternatively or in addition, a user may schedule to deploy an operating system 116 (e.g., Windows) from the administrative system 102 to different managed nodes 112 (e.g., that are "managed" by the administrative system 102). That is, the driver injection process may be implemented in the administrative system 102. The administrative system 102 may send 904 an installation application 106 to one or more managed nodes 112 using a network 110. The administrative system 102 may also send 906 an operating system image 104 to the managed node(s) 112 using the network 110. The operating system image 104 may be sent 906 by the administrative system 102 without a request from the installation application 106. Alternatively, the administrative system 102 may send 906 the operating system image 104 to the managed node(s) 112 upon request from the installation application 106.

The administrative system 102 may also send 908 one or more installation commands to the managed node(s) 112. For example, the administrative system 102 may send 908 the installation commands to the managed node(s) 112 based on an installation script 232 included on the administrative system 102. Alternatively, the installation script 232 may be sent 908 by the administrative system 102 and executed by the managed node(s) 112. As described above, the managed node(s) 112 may follow the installation commands to begin installing an operating system 116. In one configuration, the administrative system 102 receives 910 a request and/or information from the installation application 106 on the managed node(s) 112 identifying specific driver files 108, 224 for download. The administrative system 102 may send 912 one or more drivers 108, 224 to the managed node(s) 112. The drivers 108, 224 may be sent 912 based on the request received 910 from the installation application 106.

Figure 10:
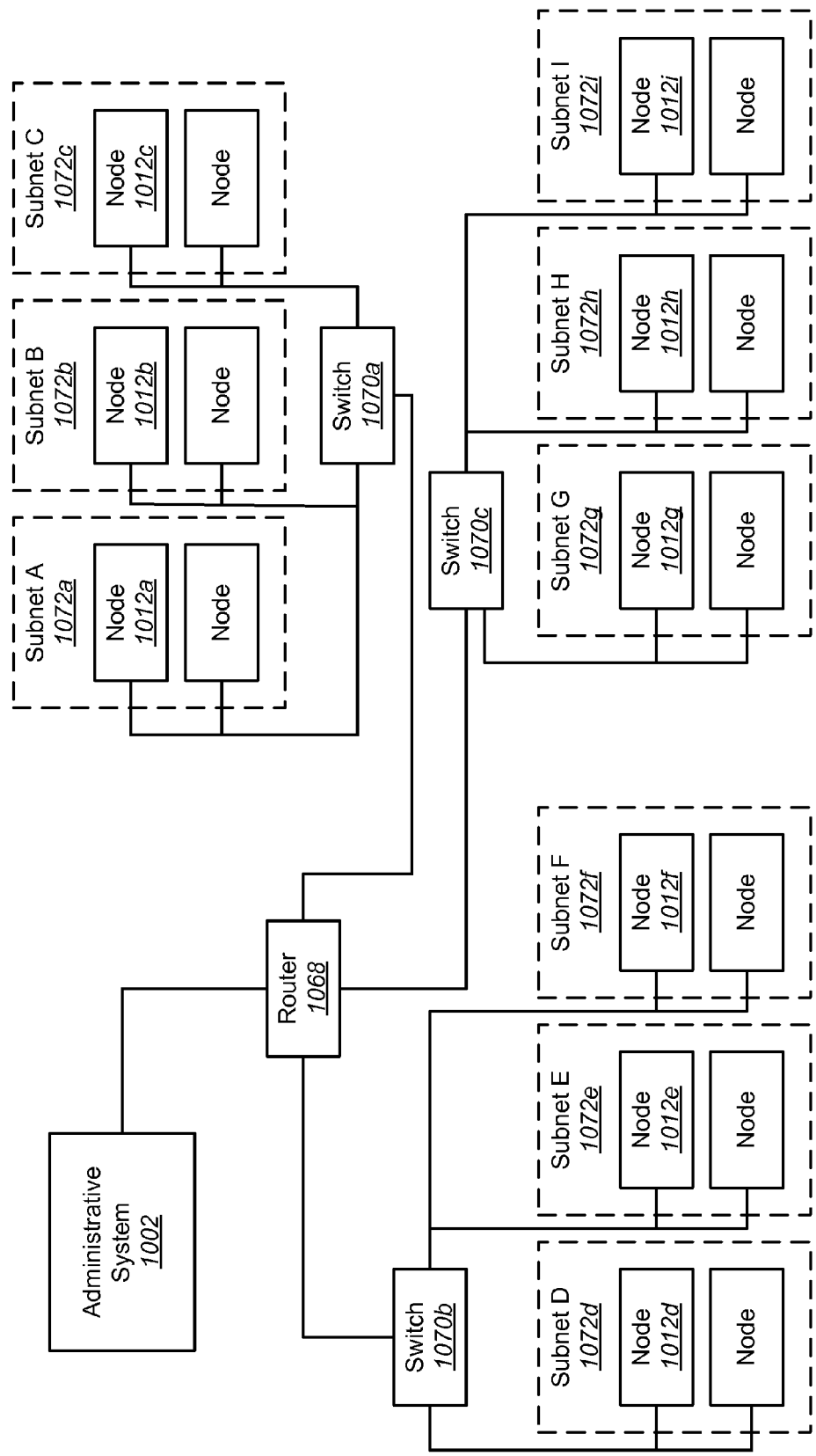
FIG. 10 is a block diagram that illustrates one configuration of a network where a system for synchronizing multicast data distribution on a computing device may be implemented.

FIG. 10 is a block diagram that illustrates one configuration of a network where a system for synchronizing multicast data distribution on a computing device may be implemented. An administrative system 1002 is connected to a router 1068. The router 1068 is connected to switches 1070a, 1070b, 1070c. The switch 1070a is connected to several nodes 1012a, 1012b, 1012c, etc. via their respective subnets 1072a, 1072b, 1072c. The switch 1070b is connected to several nodes 1012d, 1012e, 1012f, etc. via their respective subnets 1072d, 1072e, 1072f. The switch 1070c is connected to several nodes 1012g, 1012h, 1012i, etc. via their respective subnets 1072g, 1072h, 1072i. The nodes 1012 may be, for example, managed nodes 112. Although FIG. 10 only shows one router 1068, and a limited number of switches 1070, subnets 1072, and nodes 1012, many and varied numbers of routers 1068, switches 1070, subnets 1072, and nodes 1012 may be included in networks and/or systems where a system for deploying drivers for an operating system on a computing device may be implemented.

Figure 11:
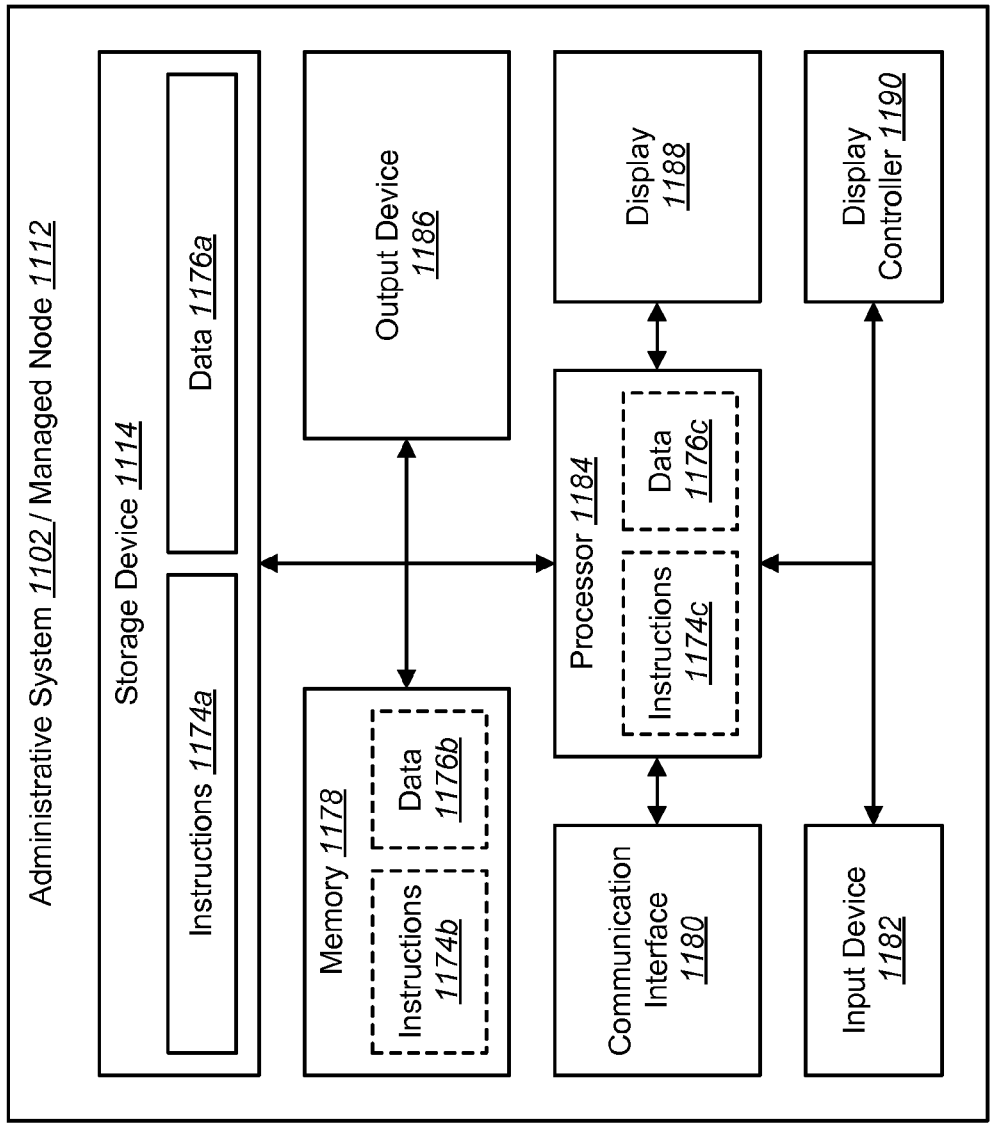
FIG. 11 illustrates various components that may be utilized in an administrative system and/or managed node.

FIG. 11 illustrates various components that may be utilized in an administrative system 1102 and/or managed node 1112. The illustrated components may be located within the same physical structure or in separate housings or structures. It should be noted that a managed node 1112 as illustrated in FIG. 11 may be a managed node 112, 212, 712, 812, 1012 illustrated in other Figures. Furthermore, an administrative system 1102 as illustrated in FIG. 11 may be an administrative system 102, 202, 1002 as illustrated in other Figures.

The administrative system 1102 and/or managed node 1112 may include a storage device 1114, a processor 1184 and memory 1178. The storage device 1114 may include instructions 1174*a* and data 1176*a*. A storage device 1114 may be, for example, a hard disk or drive, flash drive, etc. The memory 1178 may also include instructions 1174*b* and data 1176*b*. Some or all of the instructions 1174*b* and/or data 1176*b* may be loaded into memory 1178 from the storage device 1114 instructions 1174*a* and/or data 1176*a*. The processor 1184 controls the operation of the administrative system 1102 and/or managed node 1112 and may be, for example, a microprocessor, a microcontroller, a digital signal processor (DSP) or other device known in the art. The processor 1184 typically performs logical and arithmetic operations based on program instructions 1174*c* and/or data 1176*c* it loads from the memory 1178 or storage 1114. That is, FIG. 11 illustrates some of the instructions 1174*c* and data 1176*c* being loaded onto the processor 1184 from memory 1178 or storage 1114.

The administrative system 1102 and/or managed node 1112 typically may include one or more communication interfaces 1180 for communicating with other electronic devices. The communication interfaces 1180 may be based on wired communication technology, wireless communication technology, or both. Examples of different types of communication interfaces 1180 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The administrative system 1102 and/or managed node 1112 typically may include one or more input devices 1182 and one or more output devices 1186. Examples of different kinds of input devices 1182 include a keyboard, mouse, microphone, remote control device, button, joystick, trackball, touchpad, lightpen, etc. Examples of different kinds of output devices 1186 include a speaker, printer, etc. One specific type of output device which may be typically included in a computer system is a display device 1188. Display devices 1188 used with configurations disclosed herein may utilize any suitable image projection technology, such as a cathode ray tube (CRT), liquid crystal display (LCD), light-emitting diode (LED), gas plasma, electroluminescence, or the like. A display controller 1190 may also be provided for converting data stored in the memory 1178 into text, graphics, and/or moving images (as appropriate) shown on the display device 1188.

Of course, FIG. 11 illustrates only one possible configuration of an administrative system 1102 and/or managed node 1112. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The terms "memory" and "storage" should be interpreted broadly to encompass any electronic component capable of storing electronic information. The terms memory and storage may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Although in some configurations memory and storage may be implemented similarly, memory may typically provide faster access to data and instructions than storage. By way of example and not limitation, memory may be typically implemented as RAM (e.g., on an integrated circuit), whereas storage may be typically implemented as a magnetic hard disk drive. Memory and/or storage are said to be in electronic communication with a processor if the processor can read information from and/or write information to the memory and/or storage. Memory or storage that is integral to a processor is in electronic communication with the processor.

The terms "instructions" and "code" should be interpreted broadly to include any type of computer-readable or processor-readable statement(s). For example, the terms "instructions" and "code" may refer to one or more programs, routines, sub-routines, functions, procedures, etc. "Instructions" and "code" may comprise a single computer-readable or processor-readable statement or many computer-readable or processor-readable statements.

The term "computer-readable medium" refers to any available medium that can be accessed by a computer or processor. That is, the term "computer-readable medium" may refer to either a computer-readable medium and/or a processor-readable medium. By way of example, and not limitation, a computer-readable medium or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. A computer-readable medium may be non-transitory and tangible.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for installing an operating system on a computing device, comprising:
   beginning writing an operating system image to a storage device on a computing device;
   downloading, to the computing device, one or more current storage device driver files; and
   injecting, on the computing device, one or more current storage device drivers obtained from the one or more current storage device driver files without first booting an operating system obtained from the operating system image, wherein injecting the one or more current storage device drivers comprises:
      extracting driver information from the one or more current storage device driver files;
      constructing one or more registry entries based on the driver information, wherein the driver information comprises hardware identification information, service information, class Globally Unique Identifier (GUID) information, and service binary information;
      writing the one or more registry entries to a registry file; and
      copying a system file to a driver directory;
   wherein the beginning writing, the downloading and the injecting are executed in a pre-installation environment on the computing device.

2. The method of claim 1, wherein the operating system image is a uniform operating system image that does not include one or more current storage device drivers.

3. The method of claim 1, further comprising finishing writing the operating system image to the storage device on the computing device.

4. The method of claim 1, further comprising booting the computing device from the storage device, wherein the one or more current storage device drivers are used by the computing device in order to access the storage device when booting from the storage device.

5. The method of claim 1, further comprising downloading an installation application to the computing device.

6. The method of claim 1, further comprising downloading an operating system image to the computing device.

7. The method of claim 1, further comprising:
   downloading, to the computing device, one or more current device drivers other than the one or more current storage device drivers; and
   install, on the computing device, the one or more current device drivers other than the current storage device drivers.

8. The method of claim 1, further comprising:
   identifying the storage device on the computing device; and
   requesting one or more current storage device driver files based on identifying the storage device.

9. The method of claim 1, further comprising installing, on the computing device, any of the operating systems selected from a group consisting of Microsoft® Windows 2000, Windows XP, Windows 2003, Windows Vista, Windows 2008 and Windows 7.

10. The method of claim 1, wherein beginning to write the operating system image to the storage device is initiated by received installation commands.

11. The method of claim 10, wherein the installation application, the uniform operating system image and the one or more current storage device drivers are sent to a plurality of computing devices, each having a different hardware configuration.

12. A computing device configured for installing an operating system, comprising:
   a storage device;
   a processor;
   memory in electronic communication with the processor;
   instructions stored in the memory, the instructions being executable to:
      begin writing an operating system image to a storage device;
      download one or more current storage device driver files; and
      inject one or more current storage device drivers obtained from the one or more current storage device driver files without first booting an operating system obtained from the operating system image, wherein injecting the one or more current storage device drivers comprises:
         extracting driver information from the one or more current storage device driver files;
         constructing one or more registry entries based on the driver information, wherein the driver information comprises hardware identification information, service information, class Globally Unique Identifier (GUID) information, and service binary information;
         writing the one or more registry entries to a registry file; and
         copying a system file to a driver directory;
      wherein the instructions are executed in a pre-installation environment on the computing device.

13. The computing device of claim 12, wherein the operating system image is a uniform operating system image that does not include one or more current storage device drivers.

14. The computing device of claim 12, wherein the instructions are further executable to finish writing the operating system image to the storage device.

15. The computing device of claim 12, wherein the instructions are further executable to boot the computing device from the storage device, wherein the one or more current storage device drivers are used by the computing device in order to access the storage device when booting from the storage device.

16. The computing device of claim 12, wherein the instructions are further executable to download an installation application.

17. The computing device of claim 12, wherein the instructions are further executable to download an operating system image.

18. The computing device of claim 12, wherein the instructions are further executable to:
   download one or more current device drivers other than the one or more current storage device drivers; and
   install the one or more current device drivers other than the current storage device drivers.

19. The computing device of claim 12, wherein the instructions are further executable to:
   identify the storage device; and
   request one or more current storage device driver files based on identifying the storage device.

20. The computing device of claim 12, wherein the instructions are executable to install any of the operating systems selected from a group consisting of Microsoft® Windows 2000, Windows XP, Windows 2003, Windows Vista, Windows 2008 and Windows 7.

21. The computing device of claim 12, wherein beginning writing the operating system image to the storage device is initiated by received installation commands.

22. The computing device of claim 21, wherein the installation application, the uniform operating system image and the one or more current storage device drivers are sent to a plurality of computing devices, each having a different hardware configuration.

23. A non-transitory tangible computer-readable medium for installing an operating system on a computing device comprising executable instructions for:
   beginning writing an operating system image to a storage device;
   downloading one or more current storage device driver files; and
   injecting one or more current storage device drivers obtained from the one or more current storage device driver files without first booting an operating system obtained from the operating system image, wherein injecting the one or more current storage device drivers comprises:
      extracting driver information from the one or more current storage device driver files;
      constructing one or more registry entries based on the driver information, wherein the driver information comprises hardware identification information, service information, class Globally Unique Identifier (GUID) information, and service binary information;
      writing the one or more registry entries to a registry file; and
      copying a system file to a driver directory;
   wherein the beginning writing, the downloading and the injecting are executed in a pre-installation environment on the computing device.

* * * * *